No. 844,977. PATENTED FEB. 19, 1907.
W. D. VAN BRUNT.
PIPE HANGER.
APPLICATION FILED MAR. 7, 1906.
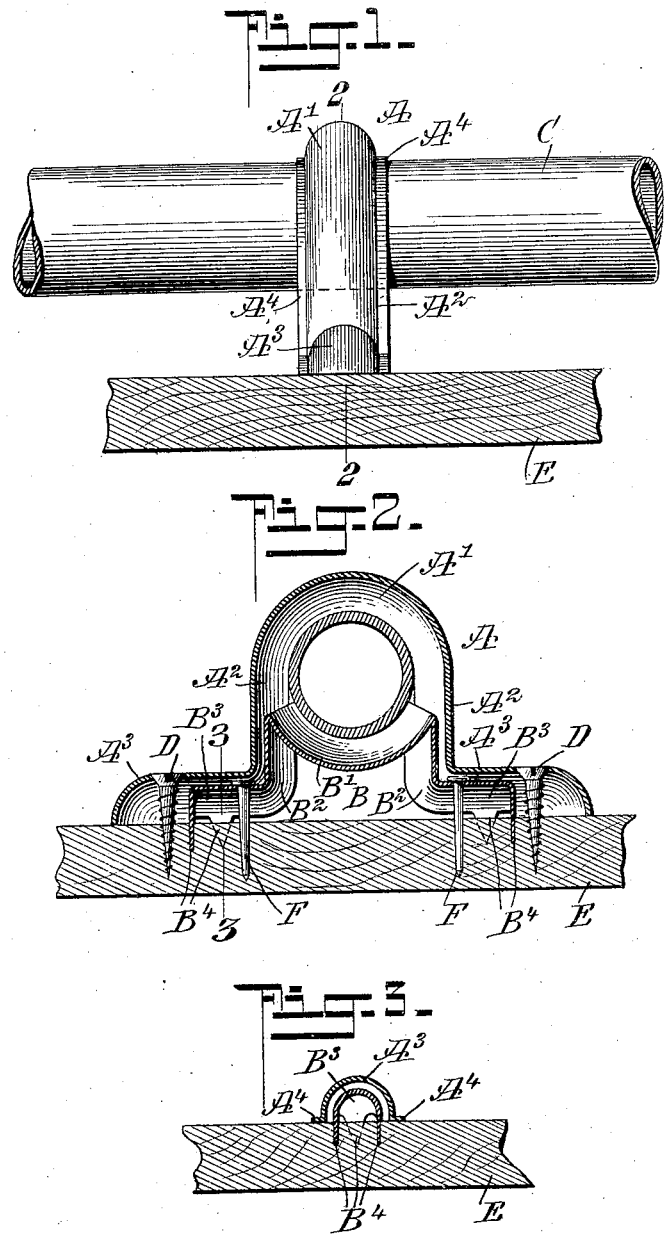
WITNESSES:
INVENTOR
Willis D. Van Brunt
BY
ATTORNEYS

UNITED STATES PATENT OFFICE.

WILLIS D. VAN BRUNT, OF SOUTHAMPTON, NEW YORK.

PIPE-HANGER.

No. 844,977. Specification of Letters Patent. Patented Feb. 19, 1907.

Application filed March 7, 1906. Serial No. 304,684.

*To all whom it may concern:*

Be it known that I, WILLIS D. VAN BRUNT, a citizen of the United States, and a resident of Southampton, in the county of Suffolk and State of New York, have invented a new and Improved Pipe-Hanger, of which the following is a full, clear, and exact description.

The object of the invention is to provide a new and improved split pipe-hanger which is simple and durable in construction, arranged for convenient attachment to a wall or other support, and adapted to permit convenient placing of the pipe or like object in position in the hanger.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement as applied. Fig. 2 is a cross-section of the same on the line 2 2 of Fig. 1, and Fig. 3 is a sectional side elevation of part of the improvement on the line 3 3 of Fig. 2.

The pipe-hanger consists, essentially, of an outer part A and an inner part B, both made from stock made approximately U shape in cross-section and bent to form segments A' and B' for receiving and supporting a pipe C or like object. The segment A' of the outer part A terminates in parallel shanks $A^2$, having outwardly-extending integral attaching-flanges $A^3$, adapted to be engaged by screws, bolts, or like fastening means D for securing the outer part A of the hanger in position on a wall or other support E.

The inner part B of the hanger has its segment B' terminating in return-bent parallel shanks $B^2$, provided at their ends with outwardly-extending flanges $B^3$, having struck-up integral prongs $B^4$, adapted to be driven into the support E, so as to hold the inner part B of the hanger temporarily in position until nails or other fastening devices F, driven through the flanges $B^3$ into the support E, securely fasten the part B in place. Now when this is done the pipe C is placed into the segment B', and then the other part A is slipped over the pipe C and onto the shanks $B^2$, so as to completely encircle the pipe C. The outer part A is now secured to the support E by the screws or fastening means D.

It is understood that the shanks $A^2$ fit and slidably engage the shanks $B^2$, held temporarily in place by the prongs $B^4$ and nails F driven into the support E, and when the outer part A is placed in position and fastened to the support E by the screws or other fastening means D then the flanges $A^3$ overlie the flanges $B^3$, and consequently the inner part B is held against movement by the action of the outer part A.

By the arrangement described an exceedingly strong and durable pipe-hanger is formed which allows of conveniently placing the pipe in position and securing it to a suitable support.

If desired, the stock from which the part A is made may be provided at the sides with outwardly-extending flanges $A^4$, as illustrated in Figs. 1 and 3, to give more strength to the hanger.

By reference to Fig. 2 it will be seen that when the parts are in position only the segment B' of the inner part B is visible, as the shanks $B^2$ thereof, as well as the flanges $B^3$, are contained within the corresponding shanks $A^2$ and flanges $A^3$ of the outer part A.

Having thus described my invention, I claim as new and desire to secure by Letters Patent—

1. A pipe-hanger comprising an outer and an inner part, each substantially U shape in cross-section, said inner part comprising a segmental portion for engaging the pipe, parallel shanks and integral flanges having attaching-prongs, said outer part comprising a segmental portion for engaging the pipe, parallel shanks and integral flanges of greater length than the flanges of the inner portion, whereby to overlie and cover said inner flanges, said flanges of the outer part being provided with openings whereby to attach said outer part.

2. A pipe-hanger comprising outer and inner parts each substantially U shape in cross-section, said inner part comprising a segmental portion for engaging the pipe, parallel shanks and integral flanges having attaching-prongs, said outer part comprising a segmental portion for engaging the pipe, parallel shanks and flanges provided with openings whereby to attach said outer part.

3. A hanger comprising an outer and an inner part, the parts being made of approximately U-shape stock, each part having a segment, and shanks extending integrally from the ends of the segments, the shanks of the inner part fitting into the shanks of the outer part, the shanks terminating in outwardly-extending attaching-flanges the flanges of the outer part overlying the flanges of the inner part.

4. A hanger comprising an outer and an inner part, the parts being made of approximately U-shape stock, each part having a segment, and shanks extending integrally from the ends of the segments, the shanks of the inner part fitting into the shanks of the outer part, the shanks terminating in outwardly-extending attaching-flanges the flanges of the outer part overlying the flanges of the inner part, and the attaching-flanges of the inner part having prongs to be driven into a support.

In testimony whereof I have signed my name to this specification in the presence of two subscribing witnesses.

WILLIS D. VAN BRUNT.

Witnesses:
EDWARD H. FOSTER,
SETH J. RAYNOR.